(12) United States Patent
Popek et al.

(10) Patent No.: US 11,277,082 B2
(45) Date of Patent: Mar. 15, 2022

(54) MULTIPURPOSE BRAKE

(71) Applicant: Hamilton Sundstrand Corporation, Charlotte, NC (US)

(72) Inventors: Grzegorz Popek, Birmingham (GB); Mital Shah, Harrow (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 36 days.

(21) Appl. No.: 16/985,590

(22) Filed: Aug. 5, 2020

(65) Prior Publication Data
US 2021/0135603 A1 May 6, 2021

(30) Foreign Application Priority Data
Nov. 5, 2019 (EP) ..................... 19275115

(51) Int. Cl.
*H02P 3/14* (2006.01)
*B64D 15/12* (2006.01)

(52) U.S. Cl.
CPC ................ *H02P 3/14* (2013.01); *B64D 15/12* (2013.01)

(58) Field of Classification Search
CPC .......... H02P 3/14; B64D 15/00; H02M 1/344
See application file for complete search history.

(56) References Cited

U.S. PATENT DOCUMENTS 3,628,112 A 12/1971 Gross
4,788,493 A * 11/1988 Liptak ................... G01R 19/14
                                              318/376
6,304,013 B1 10/2001 Akers et al.
7,170,245 B2 1/2007 Youm
7,848,122 B2 * 12/2010 Tallam ................. H02M 1/126
                                              363/39
7,906,922 B2 3/2011 Thunes et al.
8,531,140 B2 9/2013 Ibori et al.
9,923,469 B2 3/2018 Xiao et al.
9,985,565 B2 5/2018 Royak et al.
(Continued)

FOREIGN PATENT DOCUMENTS

WO 2014118678 A2 8/2014

OTHER PUBLICATIONS

European Search Report for Application No. 19275115.4 dated Apr. 21, 2020, 8 pages.

*Primary Examiner* — Said Bouziane
(74) *Attorney, Agent, or Firm* — Cantor Colburn LLP

(57) ABSTRACT

A motor drive system comprises a power converter arranged to supply an input voltage to a motor connected to the power converter by a cable arrangement. The cable arrangement includes first, second, and third conductors, each of said conductors being electrically coupled at one end to the power converter, and to the motor at the other end. A resistive portion is connected to a respective node of each of said first, second, and third conductors. A capacitive portion is connected to the resistive portion in series. A switching portion is connected in parallel to the capacitive portion and is operable in open and closed states. In the closed state, the capacitive portion is bypassed, providing for dissipation of regenerative energy from the motor. In the open state, the capacitive portion is not bypassed, and acts with the resistive portion to provide RC damper functionality to mitigate transmission line effects from the conductors.

19 Claims, 3 Drawing Sheets

(56) References Cited

U.S. PATENT DOCUMENTS

| 10,651,756 B2* | 5/2020 | Boe ..................... H02M 5/458 |
| 2011/0234128 A1* | 9/2011 | Xin ..................... F04D 27/004 |
| | | 318/400.3 |
| 2017/0063279 A1 | 3/2017 | Tateda et al. |
| 2019/0113576 A1 | 4/2019 | Saito et al. |

* cited by examiner

MULTIPURPOSE BRAKE

FOREIGN PRIORITY

This application claims priority to European Patent Application No. 19275115.4 filed Nov. 5, 2019, the entire contents of which is incorporated herein by reference.

Technical Field

This disclosure relates to a multipurpose brake, and in particular to a brake for use in regenerative motor drive systems, e.g. regenerative motor drive systems used in aerospace applications.

Background Art

In a regenerative motor drive systems, there is typically a power converter connected to a motor via a cable arrangement, i.e. there is a conductive path between these components. Typically, the power converter and motor in a typical three-phase system are connected via three conductors, where these conductors may carry a pulse width modulated (PWM) drive signal to the motor that causes the motor to rotate in a manner known in the art per se.

Generally, when executing dynamic mission profiles, the motor drive system must occasionally rapidly decelerate the motor, i.e. it carries out a braking operation. During braking, the motor slows which produces 'regenerative power' which must be managed properly so as to avoid damage to the drive, e.g. to the power converter within the drive system. Typically, this regenerative power charges the DC link capacitor.

In conventional systems known in the art per se, a dedicated brake resistor (DBR) is employed to dissipate regenerative power and is connected across the DC link capacitor via switches. During braking, the DBR dissipates substantial pulse power. However, dissipation through the DBR gives rise to both thermal and insulation challenges that must be accounted for when designing the motor drive and its various components, e.g. an inverter within the drive.

Additionally, the cable arrangement may, at least in some applications, be quite long, giving rise to transmission line effects between the conductors. This can be particularly problematic because the PWM signals may be reflected in such a way that the peak-to-peak voltage at the power converter may be up to twice what the components are rated for, i.e. due to unwanted constructive interference. It will be appreciated by those skilled in the art that the length of cable at which the transmission line effects become an issue will vary depending on the specification of the system, e.g. the types of device used, but by way of non-limiting example may take effect with cable lengths of 2 m or 5 m with the use of gallium nitride (GaN) or silicon carbide (SiC) devices respectively.

It would be advantageous to provide a motor drive system that addresses the problems outlined above.

SUMMARY OF THE DISCLOSURE

In accordance with a first aspect, the present disclosure provides a motor drive system that includes: a power converter arranged to supply an input voltage and a motor connected to the power converter by a cable arrangement. The cable arrangement comprises first, second, and third conductors and each of said conductors being electrically coupled at a respective first end thereof to the power converter, each of said conductors being further electrically coupled at a respective second end thereof to the motor. The drive system also includes a resistive-capacitive network comprising a resistive portion and a capacitive portion, wherein the capacitive portion is connected to the resistive portion in series. The resistive-capacitive network is connected to a respective node of each of said first, second, and third conductors. The drive system also includes a switching portion connected in parallel to the capacitive portion, said switching portion being operable in an open state and in a closed state. The switching portion is arranged such that when it is operated in the closed state, the capacitive portion is bypassed and such that when it is operated in the open state, the capacitive portion is not bypassed.

Thus it will be appreciated that aspects of the present disclosure provide an improved motor drive system in which the resistive, capacitive, and switching portions provide two different functions, depending on the operating state of the switching portion. Specifically, during normal operation, the switching portion may be operated in the open state, in which the resistive and capacitive portions are connected in series (i.e. the capacitive portion is not bypassed). This provides a resistive-capacitive (RC) filter across the cable arrangement, thereby providing an RC termination (i.e. an 'RC damper') to the transmission line formed by the conductors. During braking, the switching portion may be operated in the closed state, in which the switching portion bypasses the capacitive portion, thus providing the motor with a resistive load.

It can be seen, therefore, that the present disclosure provides an advantageous arrangement in which the same hardware provides both RC termination for the transmission line and a dissipative load for braking power. The unwanted transmission line effects can be managed appropriately, thereby reducing voltage overshoot at the motor terminals by utilising an RC damper (i.e. the combination of the resistive and capacitive portions), thereby mitigating—and potentially eliminating altogether—the need for motor winding insulation reinforcement.

In addition, the provision of the RC damper reduces the time-derivative of the voltage, i.e. dV/dt, at the motor terminals. This may allow the use of legacy motors with new converters that use 'wide band gap' devices. For example, motors designed to work with switches having a lower dV/dt such as an insulated-gate bipolar transistor (IGBT) or motors designed to be driven by a pure sinusoidal source can be used with newer converters.

The input voltage supplied by the power converter may be of any form suitable for driving the motor. In some examples, the input voltage comprises a PWM drive signal. Multi-phase PWM drive signals may be applied, e.g. on each of the conductors, in order to drive the motor in a manner known in the art per se. The benefits of the present disclosure are particularly applicable in a system that utilises PWM drive signals because these may be otherwise susceptible to the transmission line effects that may be mitigated and potentially eliminated by a system in accordance with this disclosure.

It will be appreciated that the power converter provides the input voltage suitable for driving the motor and that there are a number of such converters, known in the art per se, that can be used for this purpose. However, in some examples the power converter comprises an inverter. Those skilled in the art will appreciate that an inverter takes an AC input and produces therefrom a DC output.

Opening and closing the switching portion may be carried out by a suitable controller. Thus, in some examples, the motor drive system comprises a controller arranged to operate the switching portion between the open and closed states. The controller may be an independent unit, or it may be an integrated function of the power converter and/or the motor. For example, the power converter may, at least in some examples, transmit control signals that operate the switching portion, either directly or indirectly, e.g. a switch actuator may receive signals from the power converter and then operate the switching portion as appropriate in response to the received signals.

The length of the cable arrangement may vary according to the specific application, however in some examples the cable arrangement has a length of at least 10 m, and in some such examples the length of the cable arrangement may be at least 20 m, and may be at least 35 m.

The nodes on the conductors to which the resistive-capacitive network is connected are positioned along the conductors. While these could be located at any point along the length of the conductors, it is preferable to locate them close to the second end of the conductors, i.e. the 'distal' end of the cable connected to the motor. Such positioning is more optimal for properly terminating the effective transmission line, i.e. for providing the appropriate impedance to the cable arrangement to avoid unwanted reflections of the input voltage. Thus in some examples, each node is closer to the second end of the respective conductor than to the first end of said conductor. Thus in at least some examples, the nodes are positioned at least 50% along the length of the conductor from the first end to the second end thereof. In some such examples, the nodes are positioned at least 50%, preferably at least 75%, and further preferably at least 90% along the length of the conductor from the first end to the second end thereof. For example, the nodes may be positioned at least 95% along the length of the conductor from the first end to the second end thereof. In some examples, the nodes are positioned at the second end of the conductor, i.e. 100% along the length of the conductor from the first end to the second end thereof.

The resistive portion has an associated electrical resistance and acts to dissipate energy during braking, and as part of the RC filter during normal (i.e. non-braking) operation. This may, for example, be achieved using one or more resistors. In some examples, the resistive portion comprises first, second, and third resistors. In some such examples, the resistors are arranged such that a first terminal of the first resistor is connected to the node of the first conductor, a first terminal of the second resistor is connected to the node of the second conductor, and a first terminal of the third resistor is connected to the node of the third conductor.

While the resistive portion could comprise dedicated, discrete resistive components, e.g. standalone resistors such as fixed resistors, in some examples the resistive portion comprises a resistive load, for example a de-icing panel. In accordance with such examples, the excess regenerative power dissipated during braking may be provided to a de-icing panel so as to waste less of the regenerative power. Such a de-icing panel may already be present as part of the application, for example in an aerospace application, a de-icing panel may already be provided to prevent the accumulation of atmospheric ice on aircraft surfaces (e.g. on the wings, propellers, rotor blades, etc.).

The resistance of the resistive portion may be set as appropriate during design and testing, in order to properly match the impedance of the transmission line and for suitable dissipation of regenerative power from the motor. However, in some examples, the resistive portion may have a resistance in the tens or hundreds of ohms. For example, the resistance of the resistive portion may be between $10\Omega$ and $1\ k\Omega$ The resistance may, in some examples, be a sum of resistances arising from a plurality of resistive components. For example, the total resistance of the resistive portion may be achieved by a combination of dedicated resistors and/or dissipative loads such as a de-icing panel. An appropriate selection of components may be made so as to 'tune' the total resistance of the resistive portion to a desired value.

The capacitive portion has an associated capacitance that, in combination with the resistance of the resistive portion, determines the time constant of the RC filter terminating the transmission line when the switching portion is in its open state. The capacitive portion may comprise a capacitor, and in some examples may comprise first, second, and third capacitors. In some such examples, the first capacitor is connected to the node of the first conductor via the resistive portion, the second capacitor is connected to the node of the second conductor via the resistive portion, and the third capacitor is connected to the node of the third conductor via the resistive portion.

Thus, in a set of examples, the first capacitor is connected to the node of the first conductor via the first resistor, the second capacitor is connected to the node of the second conductor via the second resistor, and the third capacitor is connected to the node of the third conductor via the third resistor.

The capacitance values of the capacitor(s) within the capacitive portion are selected so as to tune the RC time constant as appropriate for the transmission line in a manner well understood in the art per se.

The resistive and capacitive portions may be arranged, at least in some examples, to form a star network. In such examples, a respective second terminal of each of the first, second, and third capacitors are connected together at a neutral node.

However, in some alternative examples, the resistive and capacitive portions may be arranged to form a wye network. In such examples, a respective second terminal of the first capacitor is connected to the node of the second conductor, a respective second terminal of the second capacitor is connected to the node of the third conductor, and a respective second terminal of the third capacitor is connected to the node of the first conductor.

It will be understood that, in accordance with such examples (i.e. the star and wye network arrangements referred to hereinabove), the respective 'second terminal' of each capacitor is the terminal of that capacitor that is not connected to the respective resistor. Those skilled in the art will appreciate that the selection of a particular network topography will generally influence the voltage across the capacitors during operation.

In some of the examples described above, the resistive portion is connected to the conductors, and the capacitive portion is connected to the resistive portion such that the resistive portion sits between the conductors and the capacitive portion. However, the resistive and capacitive portions may be arranged the other way around such that the capacitors are connected to the nodes. Thus, in an alternative set of examples, the first resistor is connected to the node of the first conductor via the capacitive portion, the second resistor is connected to the node of the second conductor via the capacitive portion, and the third resistor is connected to the node of the third conductor via the capacitive portion.

Thus, in a set of examples, the first resistor is connected to the node of the first conductor via the first capacitor, the second resistor is connected to the node of the second conductor via the second capacitor, and the third resistor is connected to the node of the third conductor via the third capacitor.

The resistive and capacitive portions may be arranged, at least in some examples, to form a star network. In such examples, a respective second terminal of each of the first, second, and third resistors are connected together at a neutral node.

However, in some alternative examples, the resistive and capacitive portions may be arranged to form a wye network. In such examples, a respective second terminal of the first resistor is connected to the node of the second conductor, a respective second terminal of the second resistor is connected to the node of the third conductor, and a respective second terminal of the third resistor is connected to the node of the first conductor.

It will be understood that, in accordance with such examples (i.e. the star and wye network arrangements referred to hereinabove), the respective 'second terminal' of each resistor is the terminal of that resistor that is not connected to the respective capacitor. As above, the selection of a particular network topography will generally influence the voltage across the capacitors during operation.

As outlined above, the switching portion acts to selectively bypass the capacitive portion to alter the behaviour of the circuit between providing an RC filter termination of the transmission line and providing a dissipative path for excess regenerative power provided by the motor during braking. In some examples, the switching portion comprises a switch that is open in the open state, and that is closed in the closed state. Such a switch may comprise a physical switch such as a relay, however in some examples the switch is a semiconductor device, for example a transistor such as a field-effect-transistor (FET). There are a number of suitable types of FET that may be chosen depending on the application requirements, e.g. supply voltages, required switching speeds, maximum current, etc.

In some examples, the switching portion comprises first, second, and third switches, wherein the first switch is connected in parallel to the first capacitor, the second switch is connected in parallel to the second capacitor, and the third switch is connected in parallel to the third capacitor. In examples in which multiple switches are provided, it is preferable that all of the switches change from their respective open state to their respective closed state, and vice versa, substantially simultaneously. Such switching behaviour may be provided by a suitable controller as appropriate.

BRIEF DESCRIPTION OF THE DRAWINGS

Certain examples of the present disclosure will now be described with reference to the accompanying drawings, in which.

DETAILED DESCRIPTION

Figure 1:
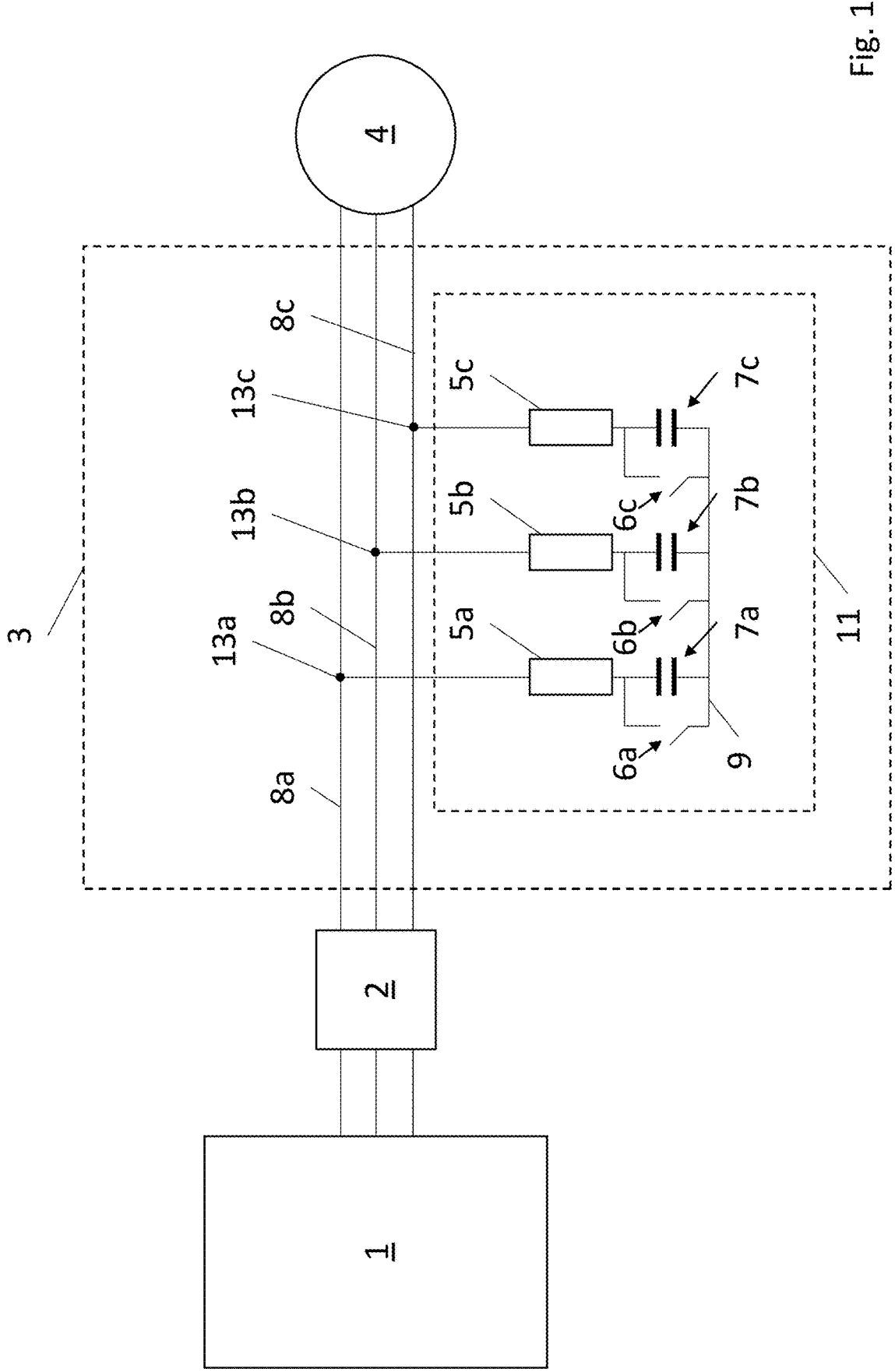
FIG. 1 is a schematic diagram of a star-connected motor drive system in accordance with an example of the present disclosure.

FIG. 1 is a schematic diagram of a star-connected motor drive system in accordance with an example of the present disclosure. The motor drive system comprises a inverter 1, a cable arrangement 2, a multipurpose brake 3 and a motor load 4. The multipurpose motor brake 3 includes a resistive portion (i.e. dissipative components), which in this example are resistors 5a, 5b, 5c. The brake further includes a capacitive portion including three capacitors 7a, 7b, 7c. The resistive and capacitive portions together form a resistive-capacitive network 11. The brake also includes a switching portion (i.e. a power switch) including three switches 6a, 6b, 6c.

The cable arrangement 2 consists of three relatively long conductors 8a, 8b, 8c. Due to their length, the conductors 8a-c experience transmission line effects.

The resistors 5a-c are connected such that a first terminal of each is connected to one of the conductors 8a-c at respective nodes 13a-c. The second terminals of the resistors 5a-c are connected to the first terminals of the capacitors 7a-c and to the first terminals of the switches 6a-c. The second terminals of the capacitors 7a-c and the respective switches 6a-c are connected together. In the star-connected motor drive system of FIG. 1, the second terminal of each of the first, second, and third capacitors 7a-c are connected together at a virtual neutral node 9.

The resistors 5a-c in this example are dedicated resistors, i.e. discrete components. However, in general, the resistors 5a-c could instead be high power resistors embedded in the motor structure or could be part or whole of a de-icing panel, e.g. embedded in the wing structure of an aircraft.

Each of the switches 6a-c is connected in parallel to a respective capacitor 7a-c such that the switches 6a-c 'bypass' the capacitors 7a-c when in the closed state. The switches may be discrete switches, relays, transistors such as field-effect-transistors (FETs) or any other suitable switching element. In this disclosure, the term 'power switches' is used interchangeably with 'switches'.

The power switches 6a-c can be controlled by a controller (not shown), which may for example be a local control card which communicates in wireless or via power over line manner with the main converter.

During normal operation acceleration or maintaining speed of the motor 4, the power switches 6a-c remain open. As the resistors 5a-c and the capacitors 7a-c are connected in series, when the switches 6a-c are open, the resistors 5a-c and capacitors 7a-c form an RC terminator at the end of the conductors of the cable arrangement 2, and acts to manage the transmission line effects imparted by the parallel conductors of the cable arrangement 2. Thus the resistors 5a-c and capacitors 7a-c form an RC damper. Heat generated by the RC damper may be sinked as appropriate. For example, the heat generated could be sinked to the motor chassis or to a de-icing panel (not shown).

When the inverter's motor controller anticipates braking (or, in some potentially overlapping examples, if current demand is set to zero), the PWM signals used to drive the motor 4 are stopped. The switches 6a-c are closed, which effectively removes the RC damper at the termination of the cables because the capacitors 7a-c are bypassed upon the switches 6a-c closing. The damping function provided by the RC damper is not necessary during the braking procedure due to the absence of switching, i.e. because the PWM signals are stopped. Closing the switches 6a-c results in the braking current (i.e. due to the regenerative power produced by the motor 4 during braking) to flow through dissipative components—i.e. the resistors 5a-c—resulting in deceleration of the motor 4.

After the braking operation is complete, the power switches 6a-c are opened and multipurpose brake resumes is RC terminator operation, i.e. as the capacitors 7a-c are no longer bypassed.

Figure 2:
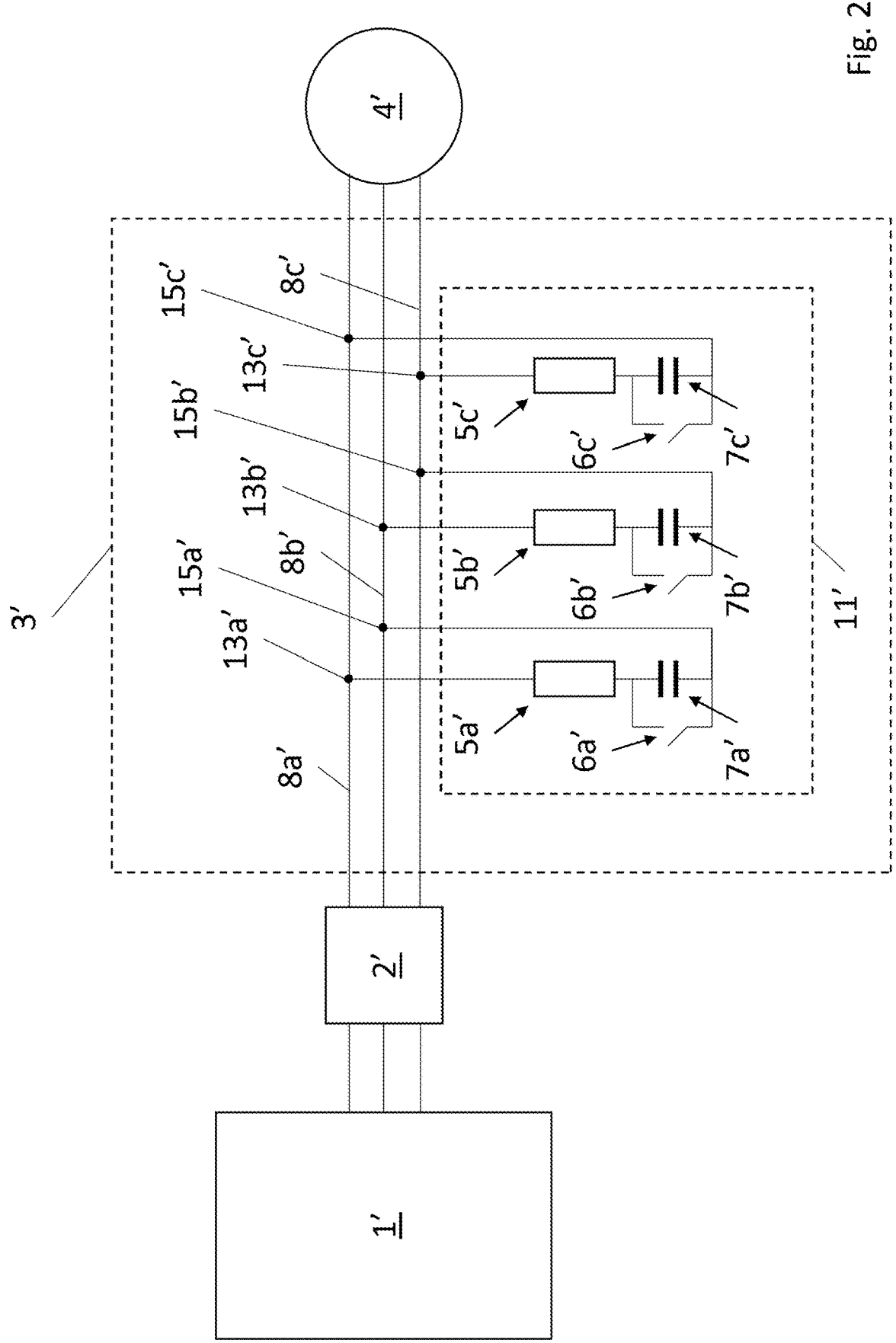
FIG. 2 is a schematic diagram of a wye-connected motor drive system in accordance with a further example of the present disclosure.

FIG. 2 is a schematic diagram of a wye-connected motor drive system in accordance with a further example of the present disclosure. Components of like construction and function to those described hereinabove with reference to FIG. 1 are provided with like reference numerals.

Unlike the star-connected system of FIG. 1, the second terminal of the first capacitor 7a' is connected to the second conductor 8b' at a node 15a'; the second terminal of the second capacitor 7b' is connected to the third conductor 8c' at a node 15b'; and the second terminal of the third capacitor 7c' is connected to the first conductor 8a' at a node 15c'. Closing the switches 6a-c' results in the capacitors 7a-c' being bypassed. The nodes 13a-c', 15a-c' on each conductor 8a-c' may be separate such that there are six nodes, or may overlap, e.g. such that the nodes 13a', 15c' on the first conductor 8a' are the same physical node.

Figure 3:
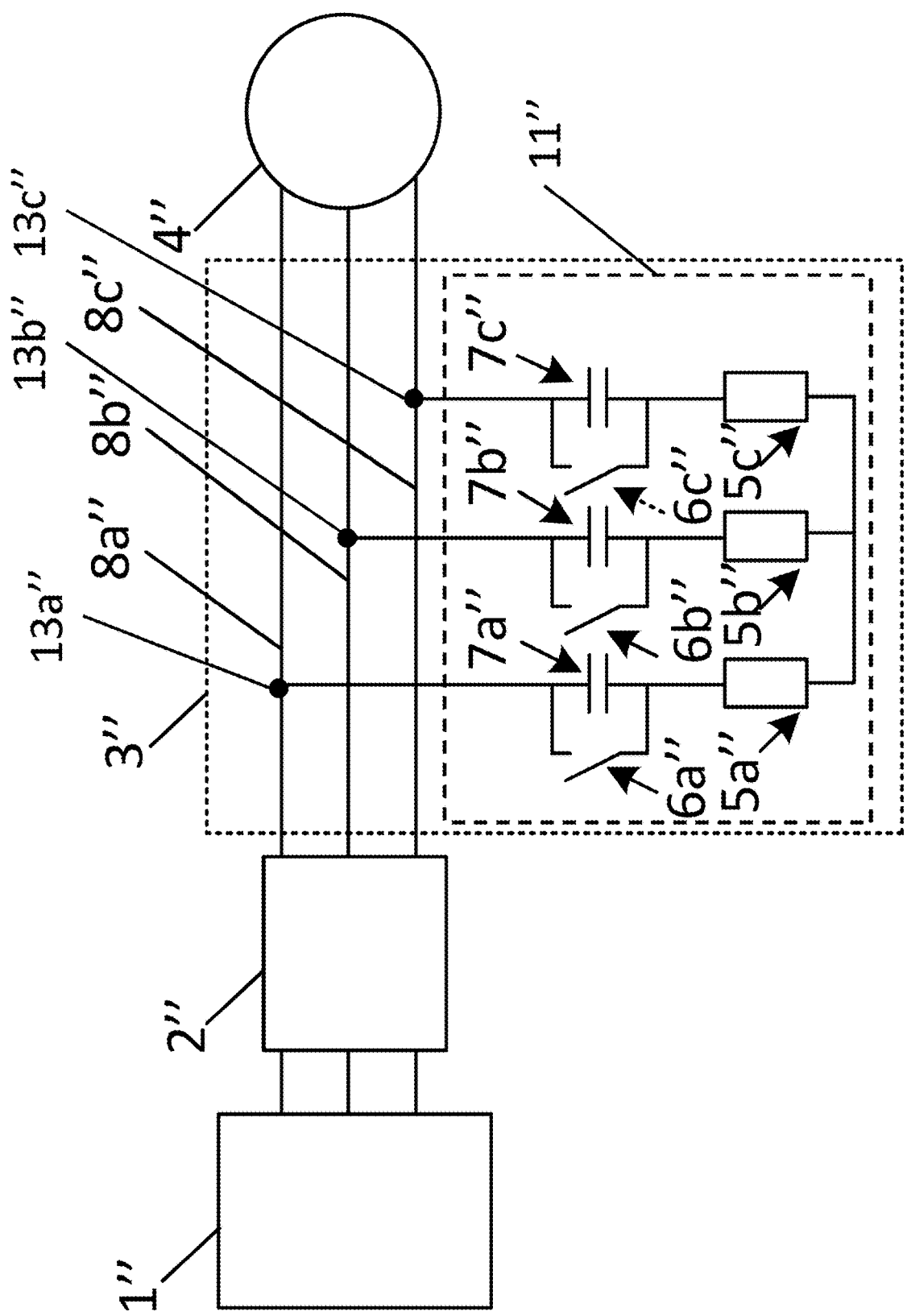
FIG. 3 is a schematic diagram of a star-connected motor drive system in which the resistive and capacitive portions are transposed in accordance with a further example of the present disclosure.

FIG. 3 is a schematic diagram of a star-connected motor drive system in which the resistive and capacitive portions are transposed in accordance with a further example of the present disclosure. Components of like construction and function to those described hereinabove with reference to FIG. 1 are provided with like reference numerals.

Compared to the star-connected system of FIG. 1, the resistors 5a-c" and the capacitors 7a-c" are transposed, i.e. a respective first terminal of each of the capacitors 7a-c" are connected to the conductors 8a-c" and a respective second terminal of the capacitors 7a-c" are connected to the respective first terminals of the resistors 5a-c". The respective second terminals of the resistors 5a-c" are connected together. As with the examples above, closing the switches 6a-c" bypasses the capacitors 6a-c" thereby leaving a resistive load connected, i.e. the resistors 5a-c".

Thus it will be appreciated by those skilled in the art that examples of the present disclosure provide an improved motor drive system in which the same components (i.e. the resistive, capacitive, and switching portions) provide both RC damper termination during normal, non-braking operation and dissipation of excess regenerative energy during braking operation. While specific examples of the disclosure have been described in detail, it will be appreciated by those skilled in the art that the examples described in detail are not limiting on the scope of the disclosure.

The invention claimed is:

1. A motor drive system comprising:
a power converter arranged to supply an input voltage;
a motor connected to the power converter by a cable arrangement, said cable arrangement comprising first, second, and third conductors, each of said conductors being electrically coupled at a respective first end thereof to the power converter, each of said conductors being further electrically coupled at a respective second end thereof to the motor; and
a resistive-capacitive network comprising a resistive portion and a capacitive portion, wherein the capacitive portion is connected to the resistive portion in series, wherein the resistive-capacitive network is connected to a respective node of each of said first, second, and third conductors;
a switching portion connected in parallel to the capacitive portion, said switching portion being operable in an open state and in a closed state;
wherein the switching portion is arranged such that when it is operated in the closed state, the capacitive portion is bypassed; and
wherein the switching portion is arranged such that when it is operated in the open state, the capacitive portion is not bypassed.

2. The motor drive system as claimed in claim 1, the power converter comprises an inverter.

3. The motor drive system as claimed in claim 1, further comprising a controller arranged to operate the switching portion between the open and closed states.

4. The motor drive system as claimed in claim 1, wherein each node is closer to the second end of the respective conductor than to the first end of said conductor.

5. The motor drive system as claimed in claim 4, wherein the nodes are positioned at least 50% along the length of the conductor from the first end to the second end thereof.

6. The motor drive system as claimed in claim 4, wherein the nodes are positioned at least 75% along the length of the conductor from the first end to the second end thereof.

7. The motor drive system as claimed in claim 4, wherein the nodes are positioned at least 90% along the length of the conductor from the first end to the second end thereof.

8. The motor drive system as claimed in claim 4, wherein the nodes are positioned at the second end of the conductor.

9. The motor drive system as claimed in claim 1, wherein the resistive portion comprises first, second, and third resistors, arranged such that a first terminal of the first resistor is connected to the node of the first conductor, a first terminal of the second resistor is connected to the node of the second conductor, and a first terminal of the third resistor is connected to the node of the third conductor.

10. The motor drive system as claimed in claim 1, wherein the capacitive portion comprises first, second, and third capacitors, wherein the first capacitor is connected to the node of the first conductor via the resistive portion, the second capacitor is connected to the node of the second conductor via the resistive portion, and the third capacitor is connected to the node of the third conductor via the resistive portion.

11. The motor drive system as claimed in claim 10, wherein a respective second terminal of each of the first, second, and third capacitors are connected together at a virtual neutral node.

12. The motor drive system as claimed in claim 10, wherein a respective second terminal of the first capacitor is connected to the node of the second conductor, a respective second terminal of the second capacitor is connected to the node of the third conductor, and a respective second terminal of the third capacitor is connected to the node of the first conductor.

13. The motor drive system as claimed in claim 1, wherein the capacitive portion comprises first, second, and third capacitors, arranged such that a first terminal of the first capacitor is connected to the node of the first conductor, a first terminal of the second capacitor is connected to the node of the second conductor, and a first terminal of the third capacitor is connected to the node of the third conductor.

14. The motor drive system as claimed in claim 13, wherein the resistive portion comprises first, second, and third resistors, wherein the first resistor is connected to the node of the first conductor via the capacitive portion, the second resistor is connected to the node of the second conductor via the capacitive portion, and the third resistor is connected to the node of the third conductor via the capacitive portion.

15. The motor drive system as claimed in claim 1, wherein the resistive portion comprises first, second, and third resistors, wherein the first resistor is connected to the node of the first conductor via the capacitive portion, the second resistor is connected to the node of the second conductor via the capacitive portion, and the third resistor is connected to the node of the third conductor via the capacitive portion.

16. The motor drive system as claimed in claim 1, wherein the resistive portion comprises a resistive load, optionally wherein the resistive load comprises a de-icing panel.

17. The motor drive system as claimed in claim 1 wherein the switching portion comprises a switch that is open in the open state, and that is closed in the closed state.

18. The motor drive system as claimed in claim 17, wherein the switch is a semiconductor device, optionally wherein the switch is a transistor, further optionally wherein the switch is a field-effect-transistor (FET).

19. The motor drive system as claimed in claim 1, wherein the switching portion comprises first, second, and third switches, wherein the first switch is connected in parallel to the first capacitor, the second switch is connected in parallel to the second capacitor, and the third switch is connected in parallel to the third.

* * * * *